(12) United States Patent
Sigler et al.

(10) Patent No.: US 10,259,071 B2
(45) Date of Patent: Apr. 16, 2019

(54) RESISTIVE WELDING ELECTRODE AND METHOD FOR SPOT WELDING STEEL AND ALUMINUM ALLOY WORKPIECES WITH THE RESISTIVE WELDING ELECTRODE

(71) Applicant: GM GLOBAL TECHNOLOGY OPERATIONS LLC, Detroit, MI (US)

(72) Inventors: David R. Sigler, Shelby Township, MI (US); Blair E. Carlson, Ann Arbor, MI (US); Michael J. Karagoulis, Okemos, MI (US); David P. Kelly, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 283 days.

(21) Appl. No.: 15/074,690

(22) Filed: Mar. 18, 2016

(65) Prior Publication Data

US 2016/0279732 A1 Sep. 29, 2016

Related U.S. Application Data

(60) Provisional application No. 62/139,197, filed on Mar. 27, 2015.

(51) Int. Cl.
| | | |
|---|---|---|
| *B23K 11/30* | (2006.01) | |
| *B23K 11/20* | (2006.01) | |
| *B23K 35/02* | (2006.01) | |
| *B23K 35/32* | (2006.01) | |
| *B23K 103/20* | (2006.01) | |

(52) U.S. Cl.
CPC .......... *B23K 11/3009* (2013.01); *B23K 11/20* (2013.01); *B23K 35/0205* (2013.01); *B23K 35/32* (2013.01); *B23K 2203/20* (2013.01)

(58) Field of Classification Search
CPC ... B23K 11/3009; B23K 11/20; B23K 11/185; B23K 35/0205; B23K 35/32; B23K 2203/20
USPC .................................. 219/75, 91.2, 119, 120
See application file for complete search history.

(56) References Cited

U.S. PATENT DOCUMENTS

| | | | | |
|---|---|---|---|---|
| 5,021,627 | A * | 6/1991 | Bersch | B23K 11/3009 219/119 |
| 2008/0078749 | A1* | 4/2008 | Sigler | B23B 5/166 219/119 |
| 2010/0252536 | A1* | 10/2010 | Spencer | B23K 11/3009 219/119 |
| 2013/0189023 | A1* | 7/2013 | Spinella | B23K 11/0026 403/270 |

(Continued)

FOREIGN PATENT DOCUMENTS

| | | | |
|---|---|---|---|
| CN | 104043898 A | 9/2014 | |
| FR | 2424093 A1 * | 11/1979 | ......... B23K 11/3009 |

*Primary Examiner* — Thien S Tran
(74) *Attorney, Agent, or Firm* — Reising Ethington P.C.

(57) ABSTRACT

A resistive welding electrode includes at least a weld face constructed of a refractory-based material that exhibits an electrical conductivity that is less than or equal to 65% of the electrical conductivity of commercially pure annealed copper as defined by the International Annealed Copper Standard (IACS). A method of using the resistive welding electrode to resistance spot weld a workpiece stack-up that includes an aluminum alloy workpiece and steel workpiece that overlap and contact each other at a faying interface is also disclosed.

20 Claims, 7 Drawing Sheets

(56) References Cited

U.S. PATENT DOCUMENTS

2013/0200048 A1  8/2013  Sigler et al.
2016/0158874 A1  6/2016  Wang et al.

* cited by examiner

RESISTIVE WELDING ELECTRODE AND METHOD FOR SPOT WELDING STEEL AND ALUMINUM ALLOY WORKPIECES WITH THE RESISTIVE WELDING ELECTRODE

CROSS-REFERENCE TO RELATED APPLICATION

This application claims the benefit of U.S. provisional application No. 62/139,197, filed on Mar. 27, 2015, the entire contents of which are incorporated herein by reference.

TECHNICAL FIELD

The technical field of this disclosure relates generally to resistance spot welding and, more particularly, to resistance spot welding an aluminum alloy workpiece and a steel workpiece.

BACKGROUND

Resistance spot welding is a process used by a number of industries to join together two or more metal workpieces. The automotive industry, for example, often uses resistance spot welding to join together pre-fabricated metal workpieces during the manufacture of vehicle closure members (e.g., a door, hood, trunk lid, or lift gate) and vehicle body structures (e.g., body sides and cross-members), among others. A number of spot welds are typically formed along a peripheral edge of the metal workpieces or some other bonding region to ensure the part is structurally sound. While spot welding has typically been practiced to join together certain similarly-composed metal workpieces—such as steel-to-steel and aluminum alloy-to-aluminum alloy—the desire to incorporate lighter weight materials into a vehicle platform has generated interest in joining an aluminum alloy workpiece to a steel workpiece by resistance spot welding. The aforementioned desire to resistance spot weld dissimilar metal workpieces is not unique to the automotive industry; indeed, it extends other industries that may utilize spot welding as a joining process including the aviation, maritime, railway, and building construction industries, among others.

Resistance spot welding relies on the resistance to the flow of an electrical current through overlapping metal workpieces and across their faying interface(s) to generate heat. To carry out such a welding process, a set of opposed spot welding electrodes is clamped at aligned spots on opposite sides of the workpiece stack-up, which typically includes two or three metal workpieces arranged in lapped configuration. An electrical current is then passed through the metal workpieces from one welding electrode to the other. Resistance to the flow of this electrical current generates heat within the metal workpieces and at their faying interface(s). When the workpiece stack-up includes an aluminum alloy workpiece and an adjacent steel workpiece, the heat generated at the faying interface and within the bulk material of those dissimilar metal workpieces initiates and grows a molten aluminum alloy weld pool that extends into the aluminum alloy workpiece from the faying interface. This molten aluminum alloy weld pool wets the adjacent faying surface of the steel workpiece and, upon cessation of the current flow, solidifies into a weld joint that bonds the two workpieces together.

In practice, however, spot welding an aluminum alloy workpiece to a steel workpiece is challenging since a number of characteristics of those two metals can adversely affect the strength—most notably the strength in peel and cross-tension—of the weld joint. For one, the aluminum alloy workpiece usually contains one or more mechanically tough, electrically insulating, and self-healing refractory oxide layers on its surface. The oxide layer(s) are typically comprised of aluminum oxides, but may include other metal oxide compounds as well, including magnesium oxides when the aluminum alloy workpiece is composed of a magnesium-containing aluminum alloy. As a result of their physical properties, the refractory oxide layer(s) have a tendency to remain intact at the faying interface where they can hinder the ability of the molten aluminum alloy weld pool to wet the steel workpiece and also provide a source of near-interface defects. Efforts have been made in the past to remove the oxide layer(s) from the aluminum alloy workpiece prior to spot welding. Such removal practices can be unpractical, though, since the oxide layer(s) have the ability to regenerate in the presence of oxygen, especially with the application of heat from spot welding operations.

The aluminum alloy workpiece and the steel workpiece also possess different properties that tend to complicate the spot welding process. Specifically, steel has a relatively high melting point (~1500° C.) and relatively high electrical and thermal resistivities, while the aluminum alloy material has a relatively low melting point (~600° C.) and relatively low electrical and thermal resistivities. As a result of these physical differences, most of the heat is generated in the steel workpiece during current flow. This heat imbalance sets up a temperature gradient between the steel workpiece (higher temperature) and the aluminum alloy workpiece (lower temperature) that initiates rapid melting of the aluminum alloy workpiece. The combination of the temperature gradient created during current flow and the high thermal conductivity of the aluminum alloy workpiece means that, immediately after the electrical current ceases, a situation occurs where heat is not disseminated symmetrically from the weld site. Instead, heat is conducted from the hotter steel workpiece through the aluminum alloy workpiece towards the welding electrode in contact with the aluminum alloy workpiece, which creates a steep thermal gradient between the steel workpiece and that particular welding electrode.

The development of a steep thermal gradient between the steel workpiece and the welding electrode in contact with the aluminum alloy workpiece is believed to weaken the integrity of the resultant weld joint in two primary ways. First, because the steel workpiece retains heat for a longer duration than the aluminum alloy workpiece after passage of the electrical current has ceased, the molten aluminum alloy weld pool solidifies directionally, starting from the region nearest the colder welding electrode (often water cooled) associated with the aluminum alloy workpiece and propagating towards the faying interface. A solidification front of this kind tends to sweep or drive defects—such as gas porosity, shrinkage voids, and micro-cracking—towards and along the faying interface within the weld joint where oxide film residue defects are already present. Second, the sustained elevated temperature in the steel workpiece promotes the growth of brittle Fe—Al intermetallic layers at and along the faying interface. Having a dispersion of weld defects together with excessive growth of Fe—Al intermetallic layers tends to reduce the peel and cross-tension strength of the weld joint.

In light of the aforementioned challenges, previous efforts to spot weld an aluminum alloy workpiece and a steel workpiece have employed a weld schedule that specifies higher currents, longer weld times, or both (as compared to spot welding steel-to-steel), in order to try and obtain a reasonable weld bond area. Such efforts have been largely unsuccessful in a manufacturing setting and have a tendency to damage the welding electrodes. Given that previous spot welding efforts have not been particularly successful, mechanical fasteners such as self-piercing rivets and flow-drill screws have predominantly been used instead. Mechanical fasteners, however, take longer to put in place and have high consumable costs compared to spot welding. They also add weight to the vehicle body structure—weight that is avoided when joining is accomplished by way of spot welding—that offsets some of the weight savings attained through the use of aluminum alloy workpieces in the first place. Advancements in spot welding that would make the process more capable of joining aluminum alloy and steel workpieces would thus be a welcome addition to the art.

SUMMARY OF THE DISCLOSURE

A resistive welding electrode and a method of using the same to resistance spot weld a workpiece stack-up that includes an aluminum alloy workpiece and steel workpiece that overlap and contact each other at a faying interface are disclosed. The resistive welding electrode includes at least a weld face constructed of a refractory-based material that exhibits an electrical conductivity that is less than or equal to 65% of the electrical conductivity of commercially pure annealed copper as defined by the International Annealed Copper Standard (IACS). The electrical conductivity of commercially pure annealed copper as defined by the IACS (also referred to as 100% IACS) is $5.80 \times 10^7$ S/m. Various constructions of the resistive welding electrode are possible including, for example, a unitary electrode structure formed entirely of the refractory-based material or a multi-piece electrode structure in which at least the component piece that includes the weld face is formed of the refractory-based material.

The refractory-based material includes at least 35 wt %, and preferably at least 50 wt %, of a refractory metal. For example, the refractory-based material may be an elemental refractory metal (100 wt % elemental refractory metal notwithstanding industry-accepted impurities) that satisfies the above electrical conductivity constraints, such as molybdenum or tungsten. The refractory-based material may also be a metal composite that satisfies the above electrical conductivity constraints, such as a molybdenum metal composite or a tungsten metal composite that includes greater than 35 wt % of molybdenum or tungsten, respectively. Indeed, one particularly preferred refractory-based material that may constitute at least the weld face of the resistive welding electrode is a tungsten-copper metal composite. A specific example of a suitable tungsten-copper metal composite contains between 50 wt % and 90 wt % of a tungsten particulate phase dispersed in a copper matrix that constitutes the remaining balance of between 50 wt % and 10 wt %.

The resistive welding electrode can be used when spot welding a workpiece stack-up that includes an aluminum alloy workpiece and a steel workpiece that overlap and contact one another to establish a faying interface. In that instance, the resistive welding electrode is pressed against a first side of the stack-up proximate the aluminum alloy workpiece and a second welding is pressed against a second side of the stack-up proximate the steel workpiece. The resistive welding electrode and the second welding electrode are pressed against their respective sides of the workpiece stack-up in axial alignment under an applied clamping force. After the welding electrodes are firmly in place, an electrical current is passed between the resistive welding electrode and the second welding electrode and through the workpiece stack-up. The electrical current heats up the steel workpiece which, in turn, initiates and grows a molten aluminum alloy weld pool within the aluminum alloy workpiece that wets an adjacent faying surface of the steel workpiece. Eventually, upon cessation of the electrical current, the molten aluminum alloy weld pool solidifies into weld joint that bonds the two workpieces together at their faying interface.

The resistive welding electrode can help improve the strength—particularly the peel and cross-tension strength—of the formed weld joint. In particular, due to its relatively low electrical conductivity, the resistive welding electrode generates heat during current flow. It also has a tendency to retain heat for a longer time than conventional high electrical conductivity copper alloy welding electrodes. The resistive welding electrode thus functions to retain heat within the aluminum alloy workpiece underneath and in contact with the electrode that would otherwise not be present if, for example, a conventional copper-zirconium welding electrode (0.1-0.2 wt % Zr and the balance Cu) was substituted for the resistive welding electrode. The heat retained within the aluminum alloy workpiece, in turn, alters the temperature gradients around the molten aluminum alloy weld pool during current flow, which is believed to promote solidification of the weld pool in a way that minimizes the unwanted accumulation of weld defects at and along a faying interface of the workpiece stack-up. Moreover, if the resistive welding electrode generates sufficient heat, then the heat that needs to be generated in the steel workpiece by the electrical current being passed between the welding electrodes can be reduced, which consequently helps inhibit the growth of brittle Fe—Al intermetallic layer(s) at the faying interface.

In addition to its ability to retain heat within the aluminum alloy workpiece, the resistive welding electrode may also alter the temperature gradients around the molten aluminum alloy weld pool during current flow in another way as well. Specifically, over the course of current flow, the weld face of the resistive welding electrode indents into the first side of the workpiece stack-up to a greater extent than the weld face of the second welding electrode indents into the second side of the stack-up. This happens because aluminum alloy softens at a much lower temperature than steel as is apparent from the relatively large difference in their respective melting points. As a result, at the time the electrical current flow being passed between the welding electrodes ceases, a contact patch formed by the resistive welding electrode is larger in surface area than a contact patch formed by the second welding electrode. Indeed, the surface area of the contact patch formed in by the resistive welding electrode may be greater than the surface area of the contact patch formed by the second welding electrode by a ratio of 1.5:1 to 16:1 or, more narrowly, by a ratio of 1.5:1 to 5:1.

The greater contact area established between the weld face of the resistive welding electrode, as compared to the weld face of the second welding electrode, causes the electrical current being passed between the welding electrodes to assume a conical flow pattern in which the path of current flow expands radially from the second welding electrode to the resistive welding electrode. This results in the current density of the electrical current being greater in the steel workpiece than in the aluminum alloy workpiece. The difference in current density concentrates heat within a smaller zone in the steel workpiece as compared to the aluminum alloy workpiece, thus modifying the temperature gradients around the molten aluminum alloy weld pool during current flow. To be sure, by concentrating heat within a smaller zone in the steel workpiece adjacent to the molten aluminum alloy weld pool, the steel workpiece functions as a heat source that helps discourage the molten aluminum alloy weld pool from solidifying directionally towards the faying interface upon cessation of current flow.

The resistive welding electrode can also be used to resistance spot weld a workpiece stack-up that includes adjacent, overlapping, and contacting aluminum alloy workpieces as well as adjacent, overlapping, and contacting steel workpieces. Such broad capabilities permit the resistive welding electrode to be used in conjunction with different metal workpiece combinations, if desired, to help promote welding output efficiency and cost containment within a manufacturing setting. Moreover, across all of these potential uses, especially when used in a way that calls for pressed contact with an aluminum alloy workpiece, the resistive welding electrode exhibits a level of inertness compared to conventional copper-zirconium welding electrodes. Of particular significance, the resistive welding electrode does not metallurgically react with aluminum over the course of repeated spot welding events to form intermetallic, oxide, and/or other contaminants that have a tendency to spall or form pits in the electrode weld face if produced and not removed. This reaction inertness reduces the need to redress the weld face of the resistive welding electrode and helps the electrode maintain a long operational lifetime.

DETAILED DESCRIPTION

Figure 1:
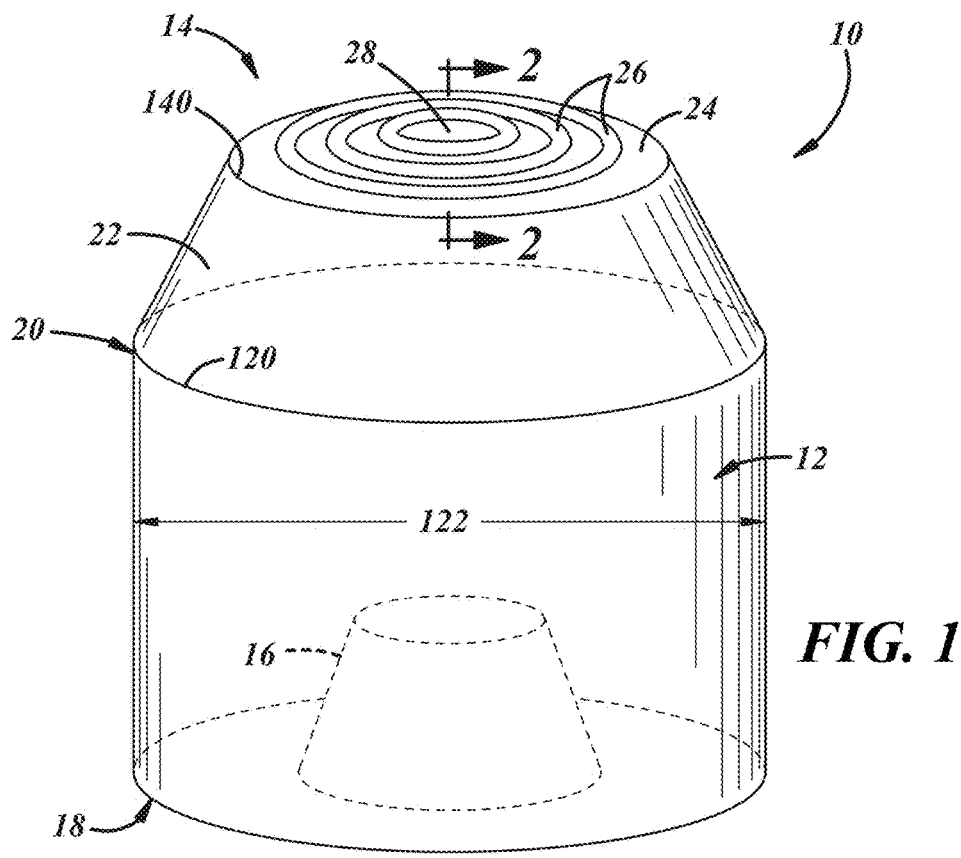
FIG. 1 is a perspective view of a resistive welding electrode according to one embodiment of the disclosure.
Figure 2:
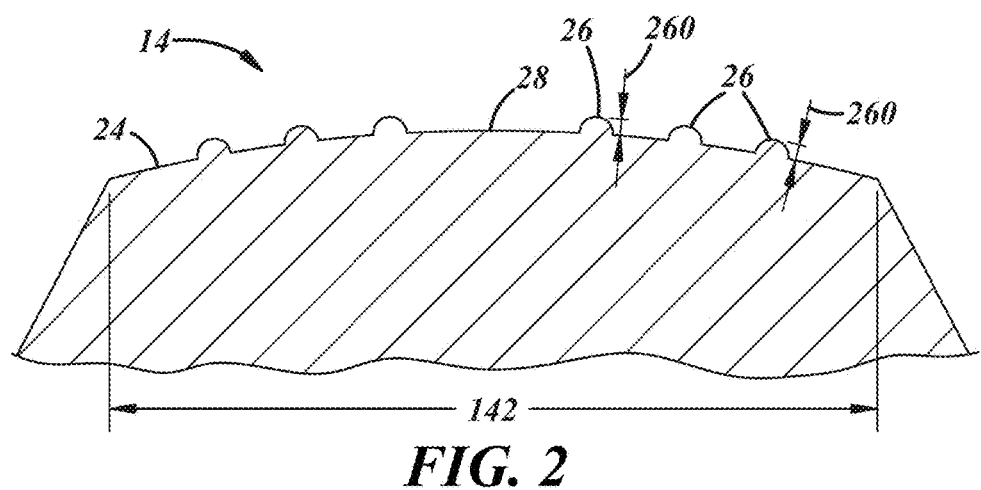
FIG. 2 is a cross-sectional view of the weld face of the resistive welding electrode shown in FIG. 1.
Figure 3:
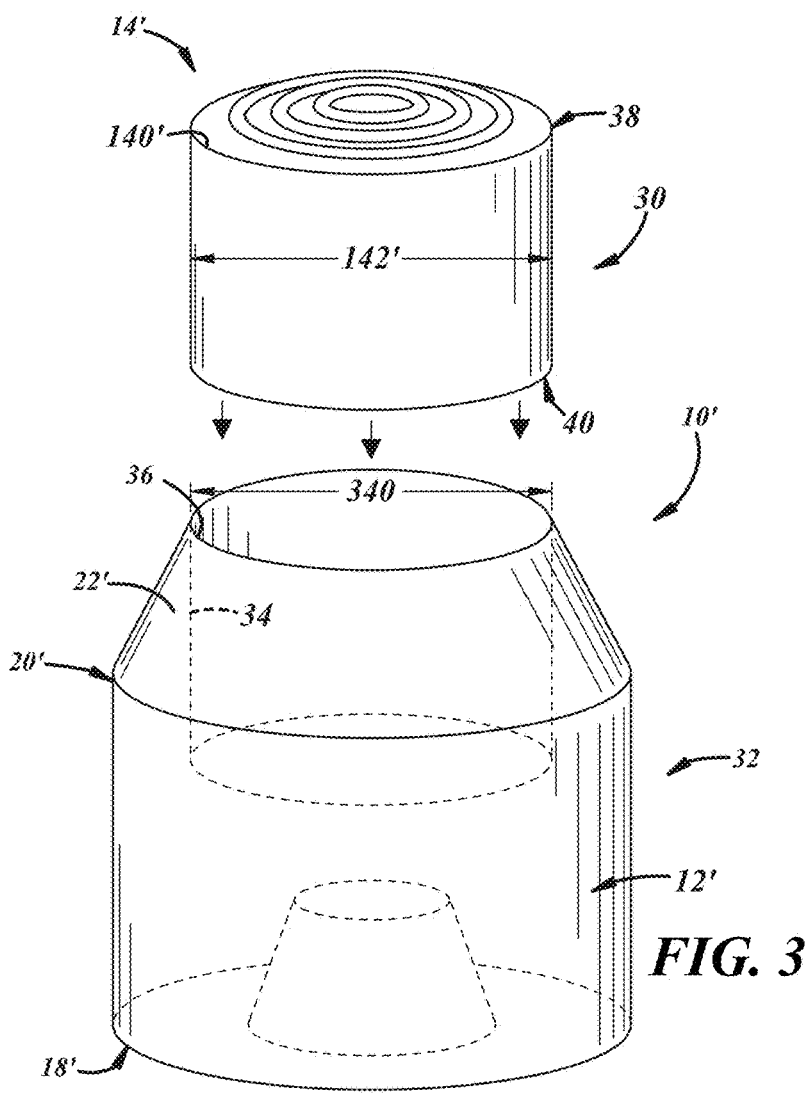
FIG. 3 is an exploded perspective view of a resistive welding electrode according to another embodiment of the disclosure.
Figure 12:
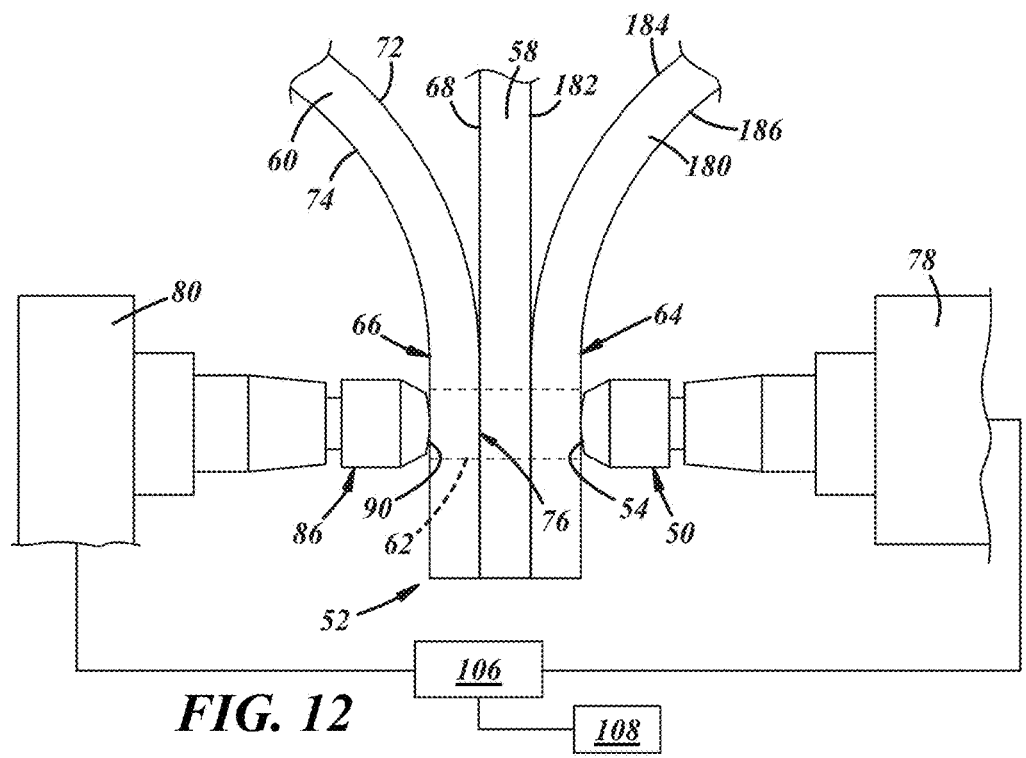
FIG. 12 depicts an alternative embodiment of the workpiece stack-up shown in FIG. 4 in that the workpiece stack-up includes an additional aluminum alloy workpiece.
Figure 13:
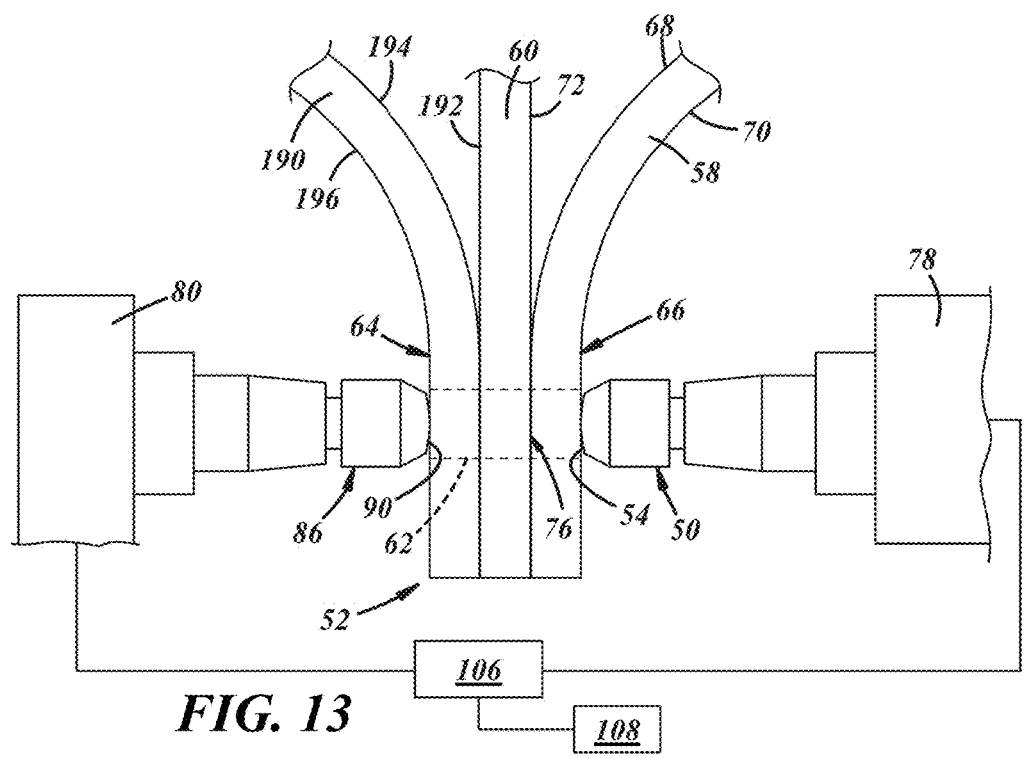
FIG. 13 depicts an alternative embodiment of the workpiece stack-up shown in FIG. 4 in that the workpiece stack-up includes an additional steel workpiece.

The resistive welding electrode described below includes at least a weld face—which may be smooth or include raised surface features—constructed of a refractory-based material that exhibits an electrical conductivity that is less than or equal to 65% of the electrical conductivity of commercially pure annealed copper as defined by the International Annealed Copper Standard (IACS). In other words, the refractory-based material has an electrical conductivity of less than $3.8 \times 10^7$ S/m. Several embodiments of the resistive welding electrode are depicted in FIGS. 1-3. When used to resistance spot weld a workpiece stack-up that includes an aluminum alloy workpiece arranged in lapped contacting configuration with a steel workpiece, an example of which is shown generally in FIGS. 5-8, the resistive welding electrode is brought into contact with, and pressed against, the aluminum alloy workpiece while a second welding electrode is brought into contact with, and pressed against, the steel workpiece. The workpiece stack-up, moreover, may include at least an additional aluminum alloy workpiece or at least an additional steel workpiece as shown in FIGS. 12-13 and discussed below.

Referring now to FIGS. 1-2, a resistive welding electrode 10 includes an electrode body 12 and a weld face 14. The electrode body 12 is cylindrical in shape and defines an accessible hollow recess 16 at a back end 18 for insertion of, and attachment with, an electrode shank (not shown). The other end of the electrode body 12, or front end 20, has a circumference 120 with a diameter 122 that preferably ranges from 12 mm to 22 mm or, more narrowly, from 16 mm to 20 mm. The weld face 14 is disposed on the front end 20 of the electrode body 12 and has a circumference 140 that is coincident with the circumference 120 of the body 12 (termed a "full face electrode") or is upwardly displaced from the circumference 120 of the body 12 by a transition nose 22 as shown. If a transition nose 22 is present, the two circumferences 120, 140 may be parallel as shown here in FIG. 1 or they may be offset such that the circumference 140 of the weld face 14 is tilted relative to the circumference 120 of the front end 20 of the electrode body 12.

The weld face 14 is the portion of the resistive welding electrode 10 that makes contact with, and is impressed either partially of fully into, an aluminum alloy workpiece at a first side of a workpiece stack-up that also includes a steel workpiece that overlaps and contacts the aluminum alloy workpiece, as discussed below with respect to FIGS. 5-8. As shown best in FIG. 2, the weld face 14 has a base weld face surface 24, which has a dome shape ascending from the circumference 140 of the weld face 14. The base weld face surface 24 may be smooth or, optionally, it may include a plurality of upstanding circular ridges 26 that surround a center 28 of the weld face 14 and project outwardly from the base weld face surface 24. In many applications, the weld face 14 can have a diameter 142 measured at its circumference 140 of 6 mm to 20 mm, and the domed base weld face surface 24 can be spherically-shaped with a radius of curvature of 15 mm to 300 mm. In a preferred embodiment, the diameter 142 of the weld face 14 ranges from 8 mm to 12 mm and the radius of curvature of the spherically-shaped base weld face surface 24 ranges from 20 mm to 150 mm or, more narrowly, from 20 mm to 50 mm.

The base weld face surface 24 constitutes the nominal surface of the weld face 14. When the weld face includes the plurality of upstanding circular ridges 26, the base weld face surface 24 accounts for 50% or more, and preferably between 50% and 80%, of the surface area of the weld face 14. The remaining surface area of the weld face 14 is attributed to the plurality of upstanding circular ridges 26, which may include anywhere from two to ten ridges 26, or more narrowly from three to five ridges 26, that are radially spaced apart from each other on the base weld face surface 24. Thus, the upstanding circular ridges 26 become larger in diameter when moving from the innermost upstanding ridge 26 that immediately surrounds the center 28 of the weld face 14 to the outermost upstanding ridge 26 that is most proximate to the circumference 140 of the weld face 14. And the portions of the base weld face surface 24 located between the upstanding circular ridges 26, as well as the portions located radially inwardly and outwardly of the plurality of circular ridges 26, may be curved or planar so as to provide the base weld face surface 24 with its overall dome shape.

The size and shape of the upstanding circular ridges 26 are designed to improve mechanical stability and reduce the electrical and thermal contact resistance at the electrode/workpiece junction on the aluminum alloy workpiece, especially if one or more refractory oxide layers are present, while at the same time being easily re-dressable. In one embodiment, as shown, each of the upstanding circular ridges 26 has a closed circumference, meaning the circumference of the ridge 26 is not interrupted by significant separations, with a cross-sectional profile that lacks sharp corners and has a curved (as shown in FIG. 2) or flat top surface. Each of the circular ridges 26 also has a ridge height 260—taken at the midpoint of the ridge 26—that extends upwards and is positively displaced from the base weld face surface 24 when viewed in cross-section. The ridge height 260 of each ridge 26 preferably ranges from 20 μm to 400 μm or, more narrowly, from 50 μm to 300 μm. And the spacings of the ridges 26, as measured between the centers of adjacent ridges 26, preferably ranges from 50 μm to 1800 μm or, more narrowly, from 80 μm to 1500 μm.

The resistive welding electrode 10 depicted in FIGS. 1-2 is an integral electrode structure that is composed entirely of a refractory-based material. In other words, the electrode body 12 and the weld face 14 are composed of the same refractory-based material and they cannot be indestructibly separated from each other. The refractory-based material used to make the resistive welding electrode includes at least 35 wt %, and preferably at least 50 wt %, of a refractory metal. In one embodiment, for example, the entire resistive welding electrode 10 may be composed of an elemental refractory metal (100 wt % elemental refractory metal notwithstanding industry-accepted impurities) such as molybdenum or tungsten. In another embodiment, the entire resistive welding electrode 10 may be composed of metal composite, such as a molybdenum metal composite or a tungsten metal composite, which includes greater than 35 wt % of its main refractory metal constituent. In one particularly preferred embodiment, the resistive welding electrode 10 is composed entirely of a tungsten-copper metal composite that contains between 50 wt % and 90 wt % of a tungsten particulate phase dispersed in a copper matrix that makes up the remaining 50 wt % and 10 wt % of the composite.

An alternative variation of the resistive welding electrode, identified by reference numeral 10', is shown in FIG. 3. The resistive welding electrode 10' shown here is similar in many respects to the resistive welding electrode 10 shown in FIGS. 1-2 and, as such, only the main differences between the two electrodes 10, 10' are discussed below. Accordingly, the above descriptions of various features of the resistive spot welding electrode 10 shown in FIGS. 1-2 apply equally to the same features of the resistive spot welding electrode 10' shown here in FIG. 3 unless specifically stated otherwise. The main difference embodied in this alternate version of the resistive welding electrode 10' is that the electrode 10' is constructed from two or more separate and distinct component pieces that are fixedly secured together.

Referring now specifically to FIG. 3, the resistive welding electrode 10' includes a first component piece 30 and a second component piece 32. The first component piece 30 includes at least the entire weld face 14' of the resistive welding electrode 10' and the second component piece 32 includes the remainder of the welding electrode 10'. The first and second component pieces 30, 32 may be fixedly secured together in any way so long as the pieces 30, 32, when secured together, are placed in electrical and thermal communication and are not able to move relative to one another during normal resistance spot welding conditions. Because the first component piece 30 and the second component piece 32 are separate and distinct from one another, the two component pieces 30, 32 can be composed of different materials, if desired. Each of the first and second component pieces 30, 32 may, for example, be composed of the same or different refractory-based materials, or the first component piece 30 may be composed of a refractory-based material while the second component piece 32 is composed of a non-refractory-based material such as a conventional copper-zirconium alloy (0.1-0.2 wt % Zr and the balance Cu).

The first component piece 30 and the second component piece 32 may be fixedly secured together, as specifically shown here, by way of an interference fit to provide the resistive welding electrode 10'. To support this type of fixed attachment, the second component piece 32 comprises the electrode body 12' including the back and front ends 18', 20'. Additionally, if the resistive welding electrode 10' is designed to include a transition nose 22', the second component piece 32 preferably also comprises the entire transition nose 22' up to the circumference 140' of the weld face 14'. In order to support fixed securement of the first component piece 30, the second component piece 32 defines an interior bore 34 having an entrance 36. The interior bore 34 may be cylindrical in shape and have a diameter 340 that ranges from 6 mm to 20 mm or, more narrowly from 8 mm to 12 mm, depending on the diameter 142' of the weld face 14' on the first component piece 30 and whether or not a transition nose 22' is present between the circumferences 120', 140' of the electrode body 12' and the weld face 14' in the finally-constructed resistive welding electrode 10'.

The first component piece 30 has a complimentary cross-sectional shape to the interior bore 34 and is sized in diameter to allow the piece 30 to be press or interference fit within the bore 34. The first component piece 30 includes at least the entire weld face 14' at one axial end 38. Thus, to fixedly secure the first component piece 30 and the second component piece 32 together to construct the resistive welding electrode 10', an axial end 40 opposite the end 38 that includes the weld face 14' is inserted into the bore 34 through the entrance 36 of the second component piece 32 with enough force to overcome the frictional forces acting between the two component pieces 30, 32. The first component piece 30 is forcibly inserted all the way into the bore 34, or until some other stop mechanism is engaged, to properly set the weld face 14' relative to the transition nose 22' (if present) or the electrode body 12' (if a transition nose 22' is not present). It is of course possible to interference fit the first component piece 30 and the second component piece 32 together in a number of other ways besides the specific implementation shown and described here despite the fact that those other ways are not depicted in the drawings and/or explicitly described in this text.

A method of using the resistive spot welding electrode 10, 10' to spot weld a workpiece stack-up 52 that includes at least an aluminum alloy workpiece and an adjacent steel workpiece is described with reference to FIGS. 4-8. The resistive spot welding electrode is denoted in these Figures by reference numeral 50, and its weld face is denoted by reference numeral 54, and such designations are intended to encompass to the specific variations 10, 10' described above as well as other variations that include at least a weld face composed of a refractory-based material that meets the electrical resistivity constrains delineated above. Additionally, FIG. 9 is a photomicrograph of a representative weld joint formed between an aluminum alloy workpiece and a steel workpiece by a conventional resistance spot welding process that does not use the resistive welding electrode as described in the present disclosure. A discussion of FIG. 9 is included here for comparative purposes and to help provide a better understanding of the impact of the resistive welding electrode 50.

Figure 4A:
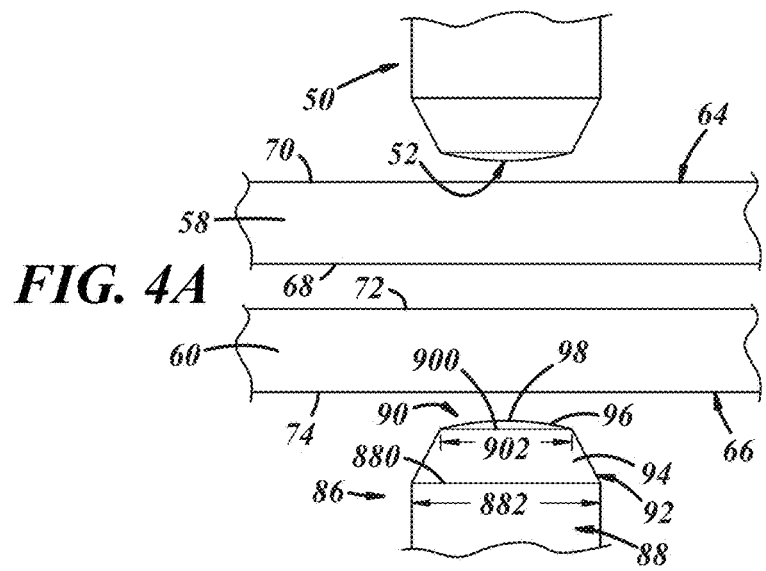
FIG. 4A is an exploded view of the resistive welding electrode, the workpiece stack-up, and the second welding electrode at the weld site.
Figure 4:
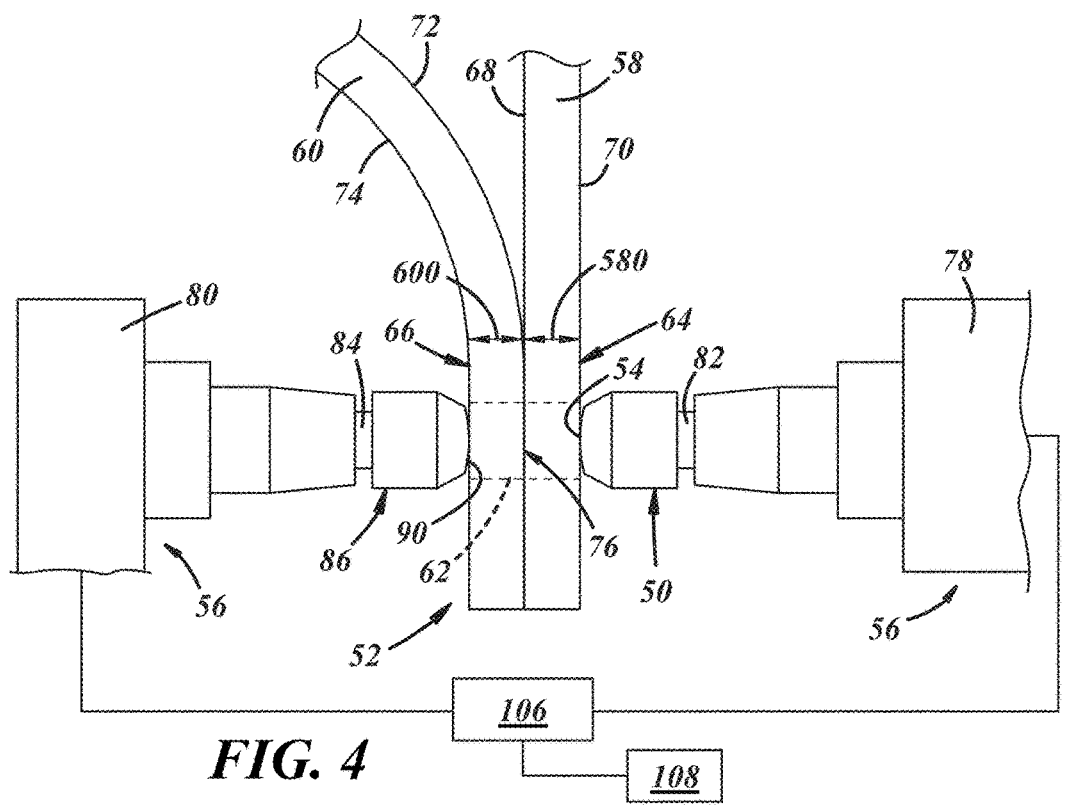
FIG. 4 is a side view of a workpiece stack-up, which includes an aluminum alloy workpiece and a steel workpiece, and a partial view of a weld gun for resistance spot welding the stack-up.

Referring now to FIG. 4, the workpiece stack-up 52 is shown along with a portion of a weld gun 56 that is mechanically and electrically configured to conduct resistance spot welding. The workpiece stack-up 52 includes an aluminum alloy workpiece 58 and a steel workpiece 60 that overlap and contact one another at a weld site 62 where spot welding is intended to be practiced. The aluminum alloy and steel workpieces 58, 60 respectively provide first and second sides 64, 66 of the workpiece stack-up 52 that are accessible to the weld gun 56. And, although not shown in FIGS. 4-8, the workpiece stack-up 52 could include additional workpieces, if desired, such as a single aluminum alloy workpiece and a pair of adjacent steel workpieces, or a single steel workpiece and a pair of aluminum workpieces, to make up a stack-up totaling three workpieces, among other possibilities. A few examples of a workpiece stack-up that includes three workpieces are depicted in FIGS. 12-13. The term "workpiece" and its aluminum alloy and steel variations is used broadly in this description to refer to any resistance spot weldable material including, but not limited to, a rolled sheet metal layer, a casting, or an extrusion, among others, inclusive of any surface layers that may optionally be present.

The aluminum alloy workpiece 58 includes an aluminum alloy substrate that may be coated or uncoated. The coated or uncoated aluminum alloy substrate may be composed of an aluminum-magnesium alloy, an aluminum-silicon alloy, an aluminum-magnesium-silicon alloy, or an aluminum-zinc alloy. The aluminum alloy substrate, for example, may be composed of a 4xxx, 5xxx, 6xxx, or 7xxx series wrought aluminum alloy sheet layer, or a 4xx.x, 5xx.x, or 7xx.x series aluminum alloy casting, and may further be employed in a variety of tempers including annealed (O), strain hardened (H), and solution heat treated (T). Some more specific kinds of aluminum alloys that can be used as the aluminum alloy substrate include, but are not limited to, AA5754 and AA5182 aluminum-magnesium alloy, AA6022 and AA 6111 aluminum-magnesium-silicon alloy, AA7003 and AA7055 aluminum-zinc alloy, and Al-10Si—Mg aluminum die casting alloy. In addition, these and other suitable aluminum alloy substrates may be coated with their natural refractory oxide layer(s), zinc, or a conversion coating, and weld-through adhesives or sealers that are normally used in resistance spot welding operations may also be present. The aluminum alloy workpiece 58 has a thickness 580 that preferably ranges from 0.3 mm to about 6.0 mm, from 0.5 mm to 4.0 mm, and more narrowly from 0.5 mm to 3.0 mm, at least at the weld site 62.

The steel workpiece 60 includes a steel substrate that can be coated or uncoated. The coated or uncoated steel substrate may be composed of any of a wide variety of steels including a low carbon steel (also referred to as mild steel), an interstitial-free (IF) steel, a high-strength low-alloy (HSLA) steel, or an advanced high strength steel (AHSS) such as dual phase (DP) steel, transformation-induced plasticity (TRIP) steel, twinning-induced plasticity (TWIP) steel, complex-phase (CP) steel, martensitic (MART) steel, or boron steel as used in press-hardened (PHS) steel workpieces. If coated, the steel substrate may be coated with zinc (galvanized), a zinc-iron alloy (galvanneal), a zinc-nickel alloy, or an aluminum-silicon alloy as is typical in press-hardened steel, to name but a few examples. The steel workpiece 60 has a thickness 600 that preferably ranges from 0.3 mm and 6.0 mm, from 0.5 mm to 4.0 mm, or more narrowly from 0.6 mm to 2.5 mm, at least at the weld site 62.

When stacked-up for spot welding, the aluminum alloy workpiece 58 includes a faying surface 68 and an exterior surface 70. Likewise, the steel workpiece 60 includes a faying surface 72 and an exterior surface 74. The faying surfaces 68, 72 of the two workpieces 58, 60 overlap and contact one another to establish a faying interface 76 at the weld site 62. The faying interface 76, as used herein, encompasses instances of direct contact between the faying surfaces 68, 72 of the aluminum alloy and steel workpieces 58, 60 as well as instances of indirect contact in which the faying surfaces 68, 72 are not touching but are in close enough proximity to each another—such as when a thin layer of adhesive, sealer, or some other intermediate material is present—that resistance spot welding can still be practiced. The exterior surfaces 70, 74 of the aluminum alloy and steel workpieces 58, 60 generally face away from each other in opposite directions and constitute the first and second sides 64, 66 of the workpiece stack-up 52.

The weld gun 56 that is partially shown in FIG. 4 is part of an automated welding operation within a manufacturing setting. The weld gun 56, for example, may be mounted on a robot positioned in the vicinity of a conveyor or other transport device that is set up to deliver the workpiece stack-up 52 (as well as others like it) to the weld gun 56. The robot may be constructed to move the weld gun 56 along the workpiece stack-up 52 so that a rapid succession of spot welding events can be performed at many different weld sites 62. The weld gun 56 may also be a stationary pedestal-type weld gun in which the workpiece stack-up 52 is manipulated and moved relative to the weld gun 56 so that multiple spot welding events can be rapidly performed at different weld sites 62 around the stack-up 52. The partial view of the weld gun 56 depicted in FIG. 4 is meant to be representative of a wide variety of weld guns, including C-type and X-type weld guns, as well as other weld gun types not specifically mentioned so long as they are capable of spot welding the workpiece stack-up 52.

The weld gun 56 includes a first gun arm 78 and a second gun arm 80 that are mechanically and electrically configured to repeatedly conduct resistance spot welding activities in accordance with a prescribed weld schedule. As shown, the first gun arm 78 is fitted with a first shank 82 that retains the resistive welding electrode 50, and the second gun arm 80 is fitted with a second shank 84 that retains a second welding electrode 86. The resistive welding electrode 50 is thus positioned to experience pressed engagement with the aluminum alloy workpiece 58 at the first side 64 of the stack-up 52 while the second welding electrode 86, which may assume any of a wide variety of constructions, is positioned to experience pressed engagement with the steel workpiece 60 at the second side 66 of the stack-up 52. Additionally, as is well known in the art, a mechanism for supplying the resistive welding electrode 50 and the second welding electrode 86 with cooling water is typically incorporated into the gun arms 78, 80 and the electrode shanks 82, 84 to keep the welding electrodes 50, 86 from overheating during spot welding.

The second welding electrode 86 can be any of a wide variety of electrode designs. Generally, as shown best in FIG. 4A, the second welding electrode 86 includes an electrode body 88 and a weld face 90. The electrode body 88 is preferably cylindrical in shape and includes an accessible hollow recess (similar to the resistive welding electrode 50) for insertion of, and attachment with, an electrode shank (e.g., the second shank 84 in FIG. 4). A front end 92 of the electrode body 88 has a circumference 880 with a diameter 882 that ranges from 12 mm to 22 mm or more narrowly from 16 mm to 20 mm. And, like before, the weld face 90 is disposed on the front end 92 of the body 88 and has a circumference 900 that is coincident with the circumference 880 of the front end 92 of the body 88 (a "full face electrode") or is upwardly displaced from the circumference 880 of the body 88 by a transition nose 94. If a transition nose 94 is present, the two circumferences 880, 900 may be parallel as shown here in FIG. 5 or they may be offset such that the circumference 900 of the weld face 90 is tilted relative to the circumference 880 of the front end 92 of the electrode body 88.

The weld face 90 is the portion of the second welding electrode 86 that makes contact with, and is impressed either partially of fully into, the steel workpiece 60 at the second side 66 of a workpiece stack-up 52. The weld face 90 preferably has a diameter 902 measured at its circumference 900 of 3 mm to 16 mm or, more narrowly, from 4 mm to 8 mm. In terms of its profile, the weld face 90 includes a base weld face surface 96 that may be planar or have a dome shape that ascends from the circumference 900 of the weld face 90. If the base weld face surface 96 is dome shaped, the surface 96 is preferably spherically-shaped with a radius of curvature that ranges from 20 mm to 400 mm or, more narrowly, from 25 mm to 100 mm. Additionally, the weld face 90 may include—but is not required to include—raised surface features at or around a center 98 of the weld face 90. These raised surface features may include a central plateau having a plateau surface that is positively displaced above the base weld face surface 96 about the center 98 of the weld face 90, a rounded projection that rises above the base weld face surface 96 about the center 98 of the weld face 90, a plurality of upstanding circular ridges similar to those described above, or some other raised feature.

The second welding electrode 86 may be composed of any suitable electrically and thermally conductive material. For example, the second welding electrode 86 may be composed of a copper alloy having an electrical conductivity of at least 80% of the electrical conductivity of commercially pure annealed copper as defined by the IACS (i.e., at least $4.65 \times 10^7$ S/m). One specific example of such a copper alloy is a copper-zirconium alloy (CuZr) that contains about 0.10 wt % to about 0.20 wt % zirconium and the balance copper. Copper alloys that meet this constituent composition and are designated C15000 are generally preferred. Other copper alloy compositions, as well as other metal compositions not explicitly recited here, that possess suitable mechanical properties as well as electrical thermal conductivity properties may also be employed.

Figure 5:
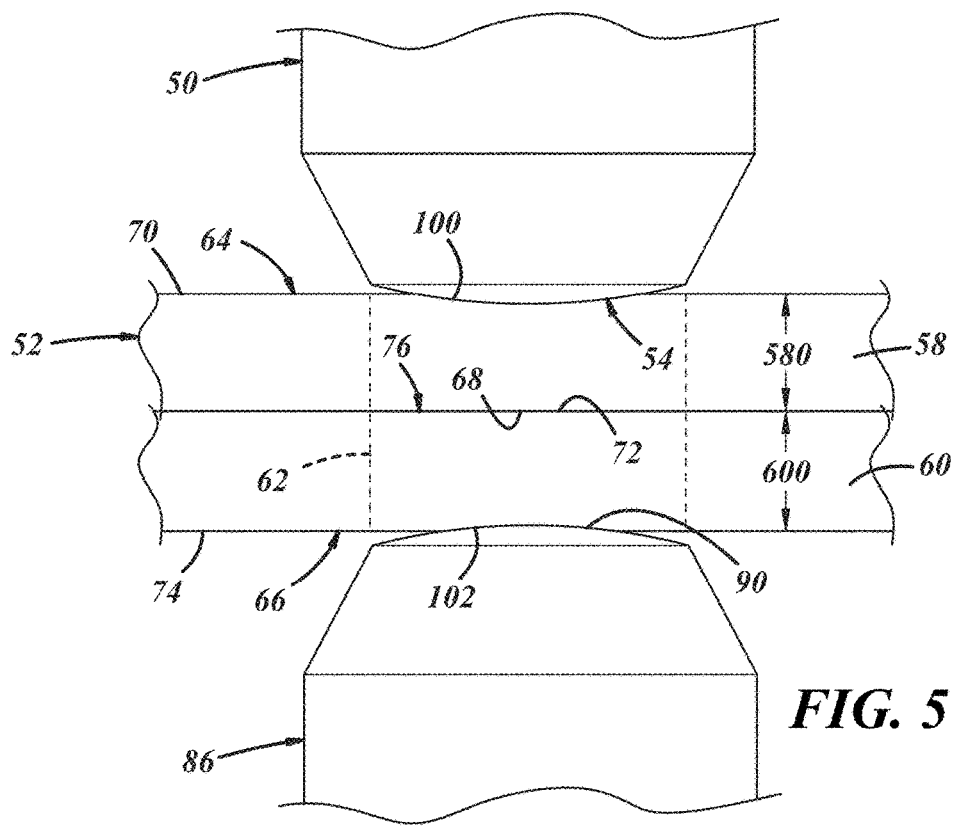
FIG. 5 depicts part of a resistance spot welding method in which each of the resistive welding electrode and the second welding electrode are pressed against the first and second sides, respectively, of the workpiece stack-up.

At the onset of the resistance spot welding method, which is depicted in FIG. 5, the workpiece stack-up 52 is located between the resistive welding electrode 50 and the opposed second welding electrode 86. The weld gun 56 (FIG. 4) is then operated to converge the resistive welding electrode 50 and second welding electrode 86 relative to one another so that their respective weld faces 54, 90 make contact with, and are pressed against, the opposite first and second sides 64, 66 of the stack-up 52 at the weld site 62, which, here, are the oppositely-facing exterior surfaces 70, 74 of the aluminum alloy and steel workpieces 58, 60. The two weld faces 54, 90 are pressed against their respective exterior workpiece surfaces 70, 74 in diametric alignment with one another at the weld site 62 under an applied clamping force that ranges, for example, between 400 lb and 2000 lb or more narrowly from 600 lb to 1300 lb. This clamping force is sufficient to begin to impress the weld faces 54, 90 into their respective first and second sides 64, 66 of the stack-up 10 (surfaces 70, 74) to establish a first contact patch 100 (on the first side 64) and a second contact patch 102 (on the second side 66). The first and second contact patches 100, 102 are relatively small at this time and only a portion of the weld faces 54, 90 are indented into the exterior surfaces 70, 74 of the aluminum alloy and steel workpieces 58, 60.

Figure 6:
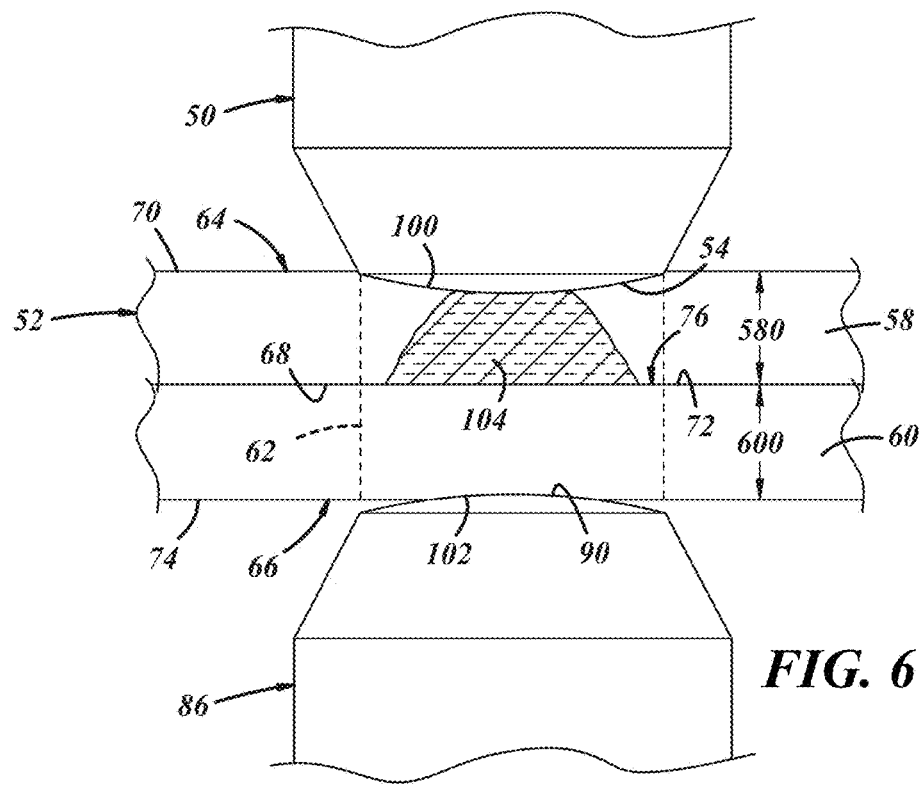
FIG. 6 depicts a part of the resistance spot welding method and shows the molten aluminum alloy weld pool that has been initiated and grown at the faying interface.

After the resistive and second welding electrodes 50, 86 are pressed against the exterior surfaces 70, 74 of their respective aluminum alloy and steel workpieces 58, 60 at the weld site 62, a DC electrical current is passed through the workpiece stack-up 52 and between the confronting weld faces 54, 90 of the welding electrodes 50, 86, as depicted in FIG. 6. Passage of the DC electrical current quickly generates heat within the more electrically and thermally resistive steel workpiece 60 and at the faying interface 76, which results in the initiation and growth of a molten aluminum alloy weld pool 104 within the aluminum alloy workpiece 58. The molten aluminum alloy weld pool 104 wets the adjacent faying surface 72 of the steel workpiece 60 and penetrates into the aluminum alloy workpiece 58 from the faying interface 76. More specifically, the molten aluminum alloy weld pool 104 penetrates a distance that typically ranges from 20% to 100% (i.e., all the way through the workpiece 58) of the thicknesses 580 of the aluminum alloy workpiece 58 as measured between the faying interface 76 and the exterior surface 70 of the aluminum alloy workpiece 58 within the first contact patch 100.

The DC electrical current may be delivered for passage between the welding electrodes 50, 86 by a power supply 106 that is controlled by a weld controller 108 (FIG. 4). The power supply 106 is preferably a medium-frequency direct current (MFDC) inverter power supply that electrically communicates with the resistive welding electrode 50 and the second welding electrode 86, although other types of power supplies can certainly be used. The weld controller 108 controls the power supply 106 by dictating the manner in which DC electrical current is exchanged between the resistive welding electrode 50 and the second welding electrode 86 based on programmed instructions including a prescribed weld schedule. The programmed characteristics of the DC electrical current may command the DC electrical current to have a constant current level or be pulsed over time, or some combination of the two, and typically call for the current level to be maintained between 5 kA and 50 kA (except possibly for off cycles between pulses) from commencement to cessation and to last for a duration of 40 ms to 2,500 ms in order to grow the molten aluminum alloy weld pool 104 to its desired size.

The resistive welding electrode 50 and second welding electrode 86 maintain their clamping force against the opposite first and second sides 64, 66 of the workpiece stack-up 52 until after passage of the DC electrical current has ceased. During the time the DC electrical current is being passed, the first and second contact patches 100, 102 grow disproportionately since the aluminum alloy workpiece 58 softens—on account of its relatively lower melting point—to a greater extent than the steel workpiece 60. As such, the second contact patch 102 associated with the second welding electrode 86 grows very little, while the first contact patch 100 associated with the resistive welding electrode 50 grows considerably more as the weld face 54 of the resistive welding electrode 50 indents into the softened aluminum alloy workpiece 58. For example, after passage of the DC electrical current is ceased, the surface area of the first contact patch 100 formed in the exterior surface 70 of the aluminum alloy workpiece 58 is usually greater than the surface area of the second contact patch 102 formed in the exterior surface 74 of the steel workpiece 60 by a ratio of 1.5:1 to 16:1 or more narrowly a ratio of 1.5:1 to 5:1. This difference in contact patch sizes results in the DC electrical current assuming a conical flow pattern through the workpiece stack-up 52—with a greater current density being present within the steel workpiece 60 than in the aluminum alloy workpiece 58—that can help improve the peel and cross-tension strength of the final weld joint, as will be discussed below in more detail.

Figure 7:
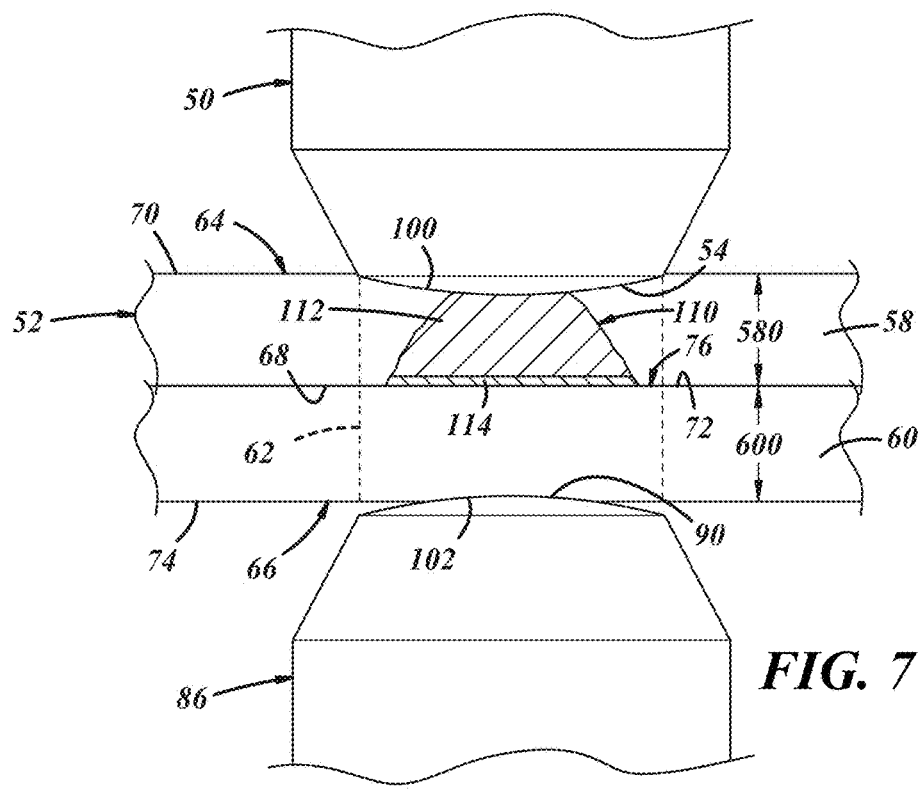
FIG. 7 depicts a weld joint that bonds the aluminum alloy workpiece and the steel workpiece together after the weld joint has been derived from the molten aluminum alloy weld pool.

After passage of the DC electrical current between the weld face 54 of the resistive welding electrode 50 and the weld face 90 of the second welding electrode 86 ceases, the molten aluminum alloy weld pool 104 solidifies into a weld joint 110 that bonds the aluminum alloy workpiece 58 and the steel workpiece 60 together, as illustrated in FIG. 7. The weld joint 110 includes an aluminum alloy weld nugget 112 and, usually, one or more Fe—Al intermetallic layers 114. The aluminum alloy weld nugget 112 extends into the aluminum alloy workpiece 58 to a distance that often ranges from about 20% to about 100% (i.e., full penetration) of the thickness 580 of the aluminum alloy workpiece 58, as measured between the faying interface 76 and the exterior surface 70 of the workpiece 58 within the first contact patch 100. The one or more Fe—Al intermetallic layers 114 are situated between the aluminum alloy weld nugget 112 and the faying surface 72 of the steel workpiece 60 at the faying interface 76. This layer or layers 114 is generally formed as a result of a reaction between the molten aluminum alloy weld pool 104 and the steel workpiece 60 during current flow and for a short period of time after current flow when the steel workpiece 60 is still hot. The one or more Fe—Al intermetallic layers 114 can include $FeAl_3$, $Fe_2Al_5$, and other compounds, and typically have a combined thickness (i.e., total thickness of all intermetallic layers) of about 1 µm to about 5 µm when measured in the same direction as the thicknesses 580, 600 of the two workpieces 58, 60.

Figure 8:
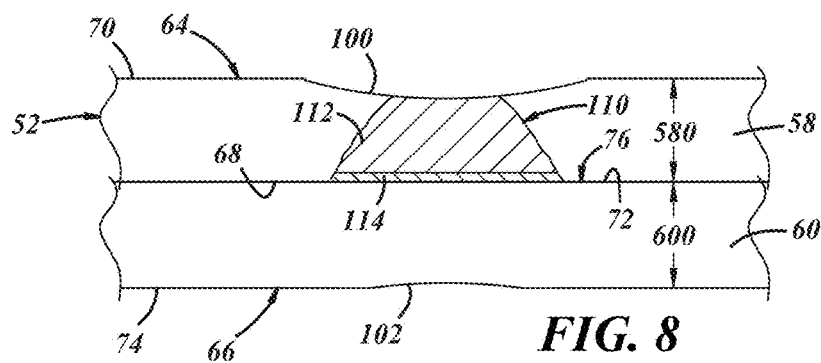
FIG. 8 depicts the workpiece stack-up after the resistive welding electrode and the second welding electrode have been separated from the aluminum alloy workpiece and the steel workpiece.
Figure 9:
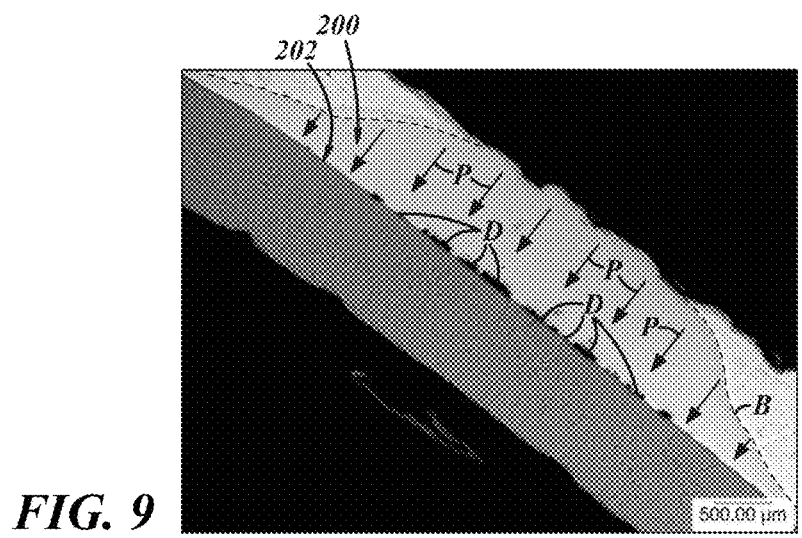
FIG. 9 is a photomicrograph of a representative weld joint formed between an aluminum alloy workpiece and steel workpiece by a conventional resistance spot welding process that that does not use the resistive welding electrode as described in the present disclosure.

The resistive welding electrode 50 and the second welding electrode 86 are eventually separated from their respective contact patches 100, 102 to free the workpiece stack-up 52, as shown in FIG. 8. The workpiece stack-up 52 may now be re-located relative to the weld gun 56 so that the resistive welding electrode 50 and the second welding electrode 86 are positioned in axial-facing alignment at another weld site 62 where the spot welding method is repeated. Or, rather than being re-located, the workpiece stack-up 52 may be moved away from the weld gun 56 to make room for another similar workpiece stack-up 52 in need of resistance spot welding. Following separation of the welding electrodes 50, 86 from their respective workpieces 58, 60, and as shown generally in FIG. 8, the first contact patch 100 has a noticeably larger surface area than the second contact patch 102 since, during current flow, the weld face 54 of the resistive welding electrode 50 indents further into the aluminum alloy workpiece 58 compared to how much the weld face 90 of the second welding electrode 86 indents into the steel workpiece 60.

The use of the resistive welding electrode 50 to spot weld the workpiece stack-up 52 is believed to improve the strength, most notably the peel and cross-tension strength, of the weld joint 110 by ultimately minimizing the unwanted accumulation of weld defects at and along the faying interface 76 of the workpiece stack-up 52. To provide some context, FIG. 9 shows a photomicrograph of a representative weld joint 200 formed between an aluminum alloy workpiece (top workpiece) and steel workpiece (bottom workpiece) by a conventional resistance spot welding process that does not use the resistive welding electrode 50 described above. Here, weld defects D have been discovered at and along the faying interface 202. These weld defects D may include shrinkage voids, gas porosity, oxide film residue, and micro-cracking, among others. When present and distributed along the faying interface 202, it has been found that the weld defects D may reduce the peel and cross-tension strength of the weld joint 200. Moreover, in addition to the weld defects D, one or more brittle Fe—Al intermetallic layers (too small to be shown) may form and grow between the aluminum alloy and steel workpieces at and along the faying interface 202 to a greater extent than desired.

Without being bound by theory, it is believed that the accumulation and distribution of the weld defects D at and along the faying interface 202 is due at least in part to the solidification behavior of the pre-existing molten aluminum alloy weld pool as it transforms into the weld joint 200. Specifically, a heat imbalance can develop between the much hotter steel workpiece (bottom workpiece) and the aluminum alloy workpiece (top workpiece) because of the dissimilar physical properties of the two materials—namely, the much greater thermal and electrical resistivities of the steel. The steel workpiece therefore acts as a heat source while the aluminum alloy workpiece acts as a heat conductor, creating a strong temperature gradient in the vertical direction that causes the molten aluminum alloy weld pool to cool and solidify from the region proximate the cooler (e.g., water cooled) welding electrode in contact with the aluminum alloy workpiece towards the faying interface 202. The path and direction of the solidification front is represented in FIG. 9 by arrows P and the boundary of the weld joint 200 is represented by broken lines B. As the solidification front progresses along path P, the weld defects D are drawn or swept toward the faying interface 202 and end up dispersed along the faying interface 202 within the weld join 200.

Referring now back to FIGS. 7-8, the use of the resistive welding electrode 50 works to avoid the broad and unwanted dispersal of weld defects towards and along the faying interface 76 during solidification of the molten aluminum alloy weld pool 104. This is because the resistive welding electrode 50—and more specifically its weld face 54—generates heat as the electrical DC current passes through it (i.e., resistive heating) and accumulates transferred heat (i.e., conductive heating) from the molten aluminum alloy weld pool 104. And because it does readily transfer such heat away from the workpiece stack-up 52 on account of its relatively low thermal conductivity (compared to a conventional CuZr welding electrode), the weld face 54 of the resistive welding electrode 50 retains heat within the underlying aluminum alloy workpiece 58 at the weld site 62. Such retained heat changes the temperature distribution within the weld site 62 by creating three-dimensional radial temperature gradients around the molten aluminum alloy weld pool 104 and/or increasing already-existing three-dimensional radial temperature gradients. These temperature gradients slow directional heat flow into the resistive welding electrode 50 from the molten aluminum alloy weld pool 104 and help promote lateral heat flow into the aluminum alloy and steel workpieces 58, 60.

Figure 10A:
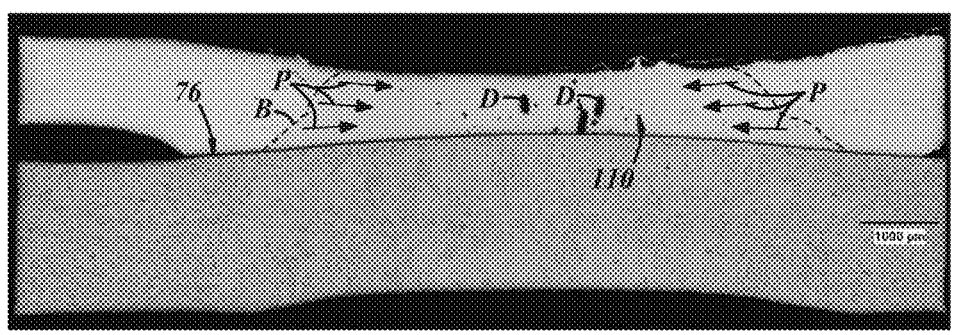
FIGS. 10A-10B are photomicrographs of weld joints that have been formed using the resistive welding electrode.
Figure 10B:
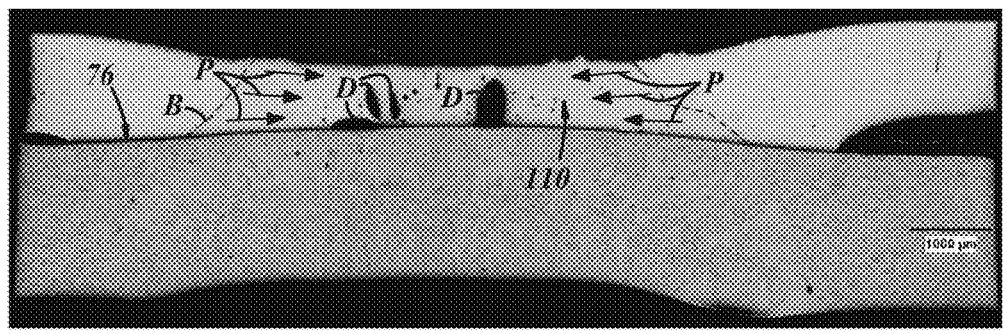

Referring now to the weld joints 110 shown in FIGS. 10A-10B, instead of the solidification front progressing toward the faying interface 76 as the molten aluminum alloy weld pool transforms into the weld joint 110, as is indicated in FIG. 9 and described above, the resistive welding electrode 50 creates three-dimensional radial temperature gradients and/or increases already-existing three-dimensional radial temperature gradients around the pre-existing molten aluminum weld pool that cause the weld pool to cool and solidify inward from its outer perimeter toward a central region. The path and direction of the solidification front is represented generally in FIGS. 10A-10B by arrows P and the boundary of the weld joints 110 are identified by broken lines B. The path P in each instance is pointed toward the central region of the weld joint 110 as a result of the altered solidification path which, consequently, draws or sweeps weld defects D towards the center of the weld joints 110 where they conglomerate and settle—as opposed to broadly disperse—at the faying interface 76 or above the faying interface 76. In particular, the oxide film residue, which is located at the faying interface 76 within the weld joint 110, can be swept toward the center of the joint 110 during solidification and become less harmful to mechanical performance.

The weld face 54 of the resistive welding electrode 50 essentially creates a location of elevated temperature within the molten aluminum alloy weld pool 104 (FIG. 7) that solidifies last, thus allowing gas porosity, shrinkage voids, micro-cracks, and other weld defects to accumulate there. Since weld defects that are present in the molten aluminum alloy weld pool 104 are swept or drawn toward the central region of the weld pool 104, and eventually the weld joint 110, they are largely situated away from the faying interface 76 or mainly at the faying interface 76 within a central location of the weld joint 110. The solidification behavior of the molten aluminum alloy weld pool 104 just described and shown in FIGS. 10A-10B, moreover, can be augmented by keeping the weld face 54 of the resistive welding electrode 50 in pressed contact with the exterior surface 70 of the aluminum alloy workpiece 58 after cessation of the DC electrical current and while the weld face 54 is still hot.

The ability to generate heat within the resistive welding electrode 50 and to retain that heat within the aluminum alloy workpiece 58 can also reduce the amount of heat that needs to be generated in the steel workpiece 60 by the DC electrical current in order to initiate and grow the molten aluminum alloy weld pool 104 (FIG. 7). The magnitude and/or duration of the DC electrical current can thus be reduced to try and limit the thickness of any Fe—Al intermetallic layers 114 that may form within the weld joint 110 and at faying interface 76. As a result of altering the solidification behavior of the molten aluminum alloy weld pool 104 by retaining heat within the aluminum alloy workpiece 58, and possibly reducing the magnitude and/or duration of the DC electrical current that is passed through the workpiece stack-up 52 and across the faying interface 76, the weld joint 110 is likely to demonstrate good overall strength and durability including adequate peel and cross-tension strength when subjected to loading.

Figure 11:
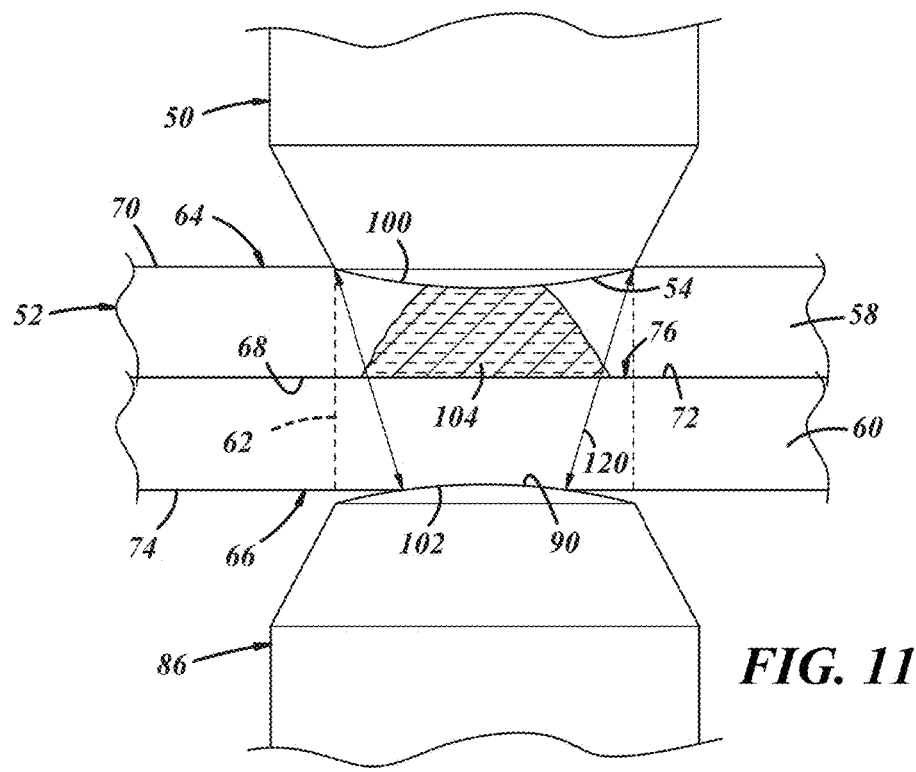
FIG. 11 is generalized illustration that shows a flow path of the DC electrical current in those instances in which the electrical current assumes a conical flow pattern between the welding electrodes and within the workpiece stack-up.

In addition to its ability to generate and retain heat within the aluminum alloy workpiece 58, the resistive welding electrode 50 may create or at least help create three-dimensional radial temperature gradients around the molten aluminum alloy weld pool 104 in a separate way as well. That is, during current flow, the DC electrical current assumes a conical flow pattern 120 through the weld site 62 and between the welding electrodes 50, 86 because the first contact patch 100 formed in the exterior surface 70 of the aluminum alloy workpiece 58 grows disproportionately larger in surface area than the second contact patch 102 formed in the exterior surface 74 of the steel workpiece 60, as shown generally in FIG. 11. As a consequence of the conical flow pattern 120, the path of the passing DC electrical current expands radially from the weld face 90 of the second welding electrode 86 to the weld face 54 of the resistive welding electrode 50 such that the electrical current density is greater in the steel workpiece 60 than in the aluminum alloy workpiece 58.

By causing the DC electrical current to assume the conical flow pattern 120—and thus decreasing the current density of the DC electrical current in the direction towards the aluminum alloy workpiece 58—heat is concentrated within a smaller zone in the steel workpiece 60 as compared to the aluminum alloy workpiece 58. The act of concentrating heat within a smaller zone in the steel workpiece 60 creates three-dimensional radial temperature gradients and/or increases already-existing three-dimensional radial temperature gradients acting within the planes of both workpieces 58, 60 and around the molten aluminum alloy weld pool 104 that ultimately promotes lateral heat dissemination away from the weld pool 104. Such affects on the temperature distribution around the molten aluminum alloy weld pool 104 help change the solidification behavior of the molten aluminum alloy weld pool 104 initiated and grown at the faying interface 76 in the manner described above so that defects in the ultimately-formed weld joint 110 are drawn or swept to a more innocuous location within the weld joint 110.

The resistive welding electrode 50 has yet another working advantage that stems from the relatively high melting temperature of the refractory-based material that constitutes at least the weld face 54. Specifically, the weld face 54 of the resistive welding electrode 50 is quite inert to the aluminum alloy compositions found within the aluminum alloy workpiece 58, even over the course of many rapid spot welding events at temperatures that approach the melting point of the aluminum alloy workpiece 58. The weld face 54, for instance, does not metallurgically react readily with aluminum alloys to form intermetallic, oxide, and/or other contaminants that have a tendency to spall or form pits in the weld face 54 if produced and not removed. The resistive welding electrode 50 can thus endure more spot welding events between redressing operations than, for instance, a conventional copper-zirconium welding electrode (0.1-0.2 wt % Zr and the balance Cu), which can help maximize and extend the operational lifetime of the resistive welding electrode 50 compared to other more conventional copper alloy welding electrodes.

The embodiments described above and shown in FIGS. 4-11 are directed to instances in which the workpiece stack-up 52 only the adjacent pair of aluminum alloy and steel workpieces 58, 60 such that the exterior surface 70 of the aluminum workpiece 58 provides the first side 64 of the stack-up 52 and the exterior surface 74 of the steel workpiece 60 provides the second side 66 of the stack-up 52. In other embodiments, however, the workpiece stack-up 52 may include at least an additional aluminum alloy workpiece or at least an additional steel workpiece so long as the additional aluminum workpiece(s) overlaps and lies adjacent to the aluminum workpiece 58 and the additional steel workpiece(s) overlaps and lies adjacent to the steel workpiece 60. Put differently, the workpiece stack-up 52 may be configured as an aluminum alloy/aluminum alloy/steel stack-up or a steel/steel/aluminum alloy stack-up, if three overlapping workpieces are desired at the weld site 62. The above descriptions of the aluminum and steel workpieces 58, 60 are equally applicable to the additional aluminum workpiece(s) and the additional steel workpiece(s), respectively.

As illustrated in FIG. 12, for example, the workpiece stack-up 52 may include the adjacent pair of aluminum alloy and steel workpieces 58, 60 described above as well as an additional aluminum alloy workpiece 180. Here, as shown, the additional aluminum alloy workpiece 180 overlaps the adjacent pair of aluminum alloy and steel workpieces 58, 60 and lies adjacent to the aluminum alloy workpiece 58. When the additional aluminum alloy workpiece 180 is so positioned, the exterior surface 74 of the steel workpiece 60 provides the second side 66 of the workpiece stack-up 52, as before, while the aluminum alloy workpiece 58 that lies adjacent to the steel workpiece 60 now includes a pair of opposed faying surfaces 68, 182. The faying surface 68 that faces the steel workpiece 60 continues to establish the faying interface 76 along with the confronting faying surface 72 of the steel workpiece 60 as previously described. The other faying surface 182 overlaps and contacts a faying surface 184 of the additional aluminum alloy workpiece 180. As such, in this particular arrangement of lapped workpieces 58, 60, 180, an exterior surface 186 of the additional aluminum alloy workpiece 180 provides the first side 64 of the workpiece stack-up 52.

In another example, as illustrated in FIG. 13, the workpiece stack-up 52 may include the adjacent pair of aluminum alloy and steel workpieces 58, 60 described above as well as an additional steel workpiece 190. Here, as shown, the additional steel workpiece 190 overlaps the adjacent pair of aluminum alloy and steel workpieces 58, 60 and lies adjacent to the steel workpiece 60. When the additional steel workpiece 190 is so positioned, the exterior surface 70 of the aluminum alloy workpiece 58 provides the first side 64 of the workpiece stack-up 52, as before, while the steel workpiece 60 that lies adjacent to the aluminum alloy workpiece 58 now includes a pair of opposed faying surfaces 72, 192. The faying surface 72 that faces the aluminum alloy workpiece 58 continues to establish the faying interface 76 along with the confronting faying surface 68 of the aluminum alloy workpiece 58 as previously described. The other faying surface 192 overlaps and contacts a faying surface 194 of the additional steel workpiece 190. As such, in this particular arrangement of lapped workpieces 58, 60, 190, an exterior surface 196 of the additional steel workpiece 190 provides the second side 66 of the workpiece stack-up 52.

The above description of preferred exemplary embodiments and related examples are merely descriptive in nature; they are not intended to limit the scope of the claims that follow. Each of the terms used in the appended claims should be given its ordinary and customary meaning unless specifically and unambiguously stated otherwise in the specification.

The invention claimed is:

1. A resistive welding electrode comprising:
   an electrode body having a front end and a back end, the electrode body defining an accessible hollow recess open at the back end and having a circumference at the front end; and
   a weld face disposed on the front end of the electrode body, the weld face having a circumference that is coincident with the circumference of the electrode body at the front end of the electrode body or intersects with a transition nose that extends upwardly from the circumference of the front end of the electrode body, wherein at least the weld face is composed of a refractory-based material that includes at least 35 wt % of a refractory metal and has an electrical conductivity that is less than or equal to $3.8 \times 10^7$ S/m, and wherein the refractory-based material is elemental molybdenum or elemental tungsten.

2. The resistive welding electrode set forth in claim 1, wherein the weld face has a base weld face surface having a diameter that ranges from 6 mm to 20 mm and a spherical radius of curvature ranging from 15 mm to 300 mm.

3. The resistive welding electrode set forth in claim 2, wherein the weld face includes a plurality of upstanding, radially-spaced circular ridges that surround a center of the weld face and project outwardly from the base weld face surface.

4. The resistive welding electrode set forth in claim 1, wherein the electrode body and the weld face are integrally formed and both the electrode body and the weld face are composed of elemental molybdenum or elemental tungsten.

5. The resistive welding electrode set forth in claim 1, wherein the electrode comprises two component pieces that are fixedly secured together, the two component pieces comprising a first component piece and a second component piece, the first component piece having an axial end, which includes at least the weld face of the resistive welding electrode, and a side wall, and the second component piece including the remainder of the resistive welding electrode and defining an interior bore that receives the first component piece, the side wall of the first component piece being covered by the second component piece so that only the axial end of the first component piece that includes at least the weld face of the resistive welding electrode is exposed.

6. The resistive welding electrode set forth in claim 5, wherein the first component piece is interference fit within the interior bore defined by the second component piece in order to fixedly secure the two component pieces together into the resistive welding electrode.

7. A method of resistance spot welding a workpiece stack-up that includes an aluminum alloy workpiece and an adjacent steel workpiece, the method comprising:

provide a workpiece stack-up that includes an aluminum alloy workpiece and a steel workpiece that overlap and contact to establish a faying interface, the workpiece stack-up having a first side proximate the aluminum alloy workpiece and a second side proximate the steel workpiece;

contacting the first side of the workpiece stack-up with a weld face of a resistive welding electrode, the resistive welding electrode comprising an electrode body and an integrally formed weld face and being entirely composed of a refractory-based material that includes at least 35 wt % of a refractory metal and has an electrical conductivity that is less than or equal to $3.8 \times 10^7$ S/m;

contacting the second side of the workpiece stack-up with a weld face of a second welding electrode;

passing an electrical current between the weld face of the resistive welding electrode and the weld face of the second welding electrode, and through the workpiece stack-up, to create a molten aluminum alloy weld pool within the aluminum alloy workpiece that lies adjacent to the steel workpiece; and ceasing passage of the electrical current to allow the molten aluminum alloy weld pool to solidify into a weld joint that bonds the adjacent aluminum alloy and steel workpieces together at their faying interface.

8. The resistive welding electrode set forth in claim 7, wherein the refractory-based material is elemental molybdenum or elemental tungsten.

9. The resistive welding electrode set forth in claim 7, wherein the refractory-based material is a metal composite that includes 35 wt % or greater of molybdenum or tungsten.

10. The resistive welding electrode set forth in claim 9, wherein the refractory-based material is a tungsten-copper metal composite that comprise 50 wt % to 90 wt % of a tungsten particulate phase dispersed in a copper matrix.

11. The method set forth in claim 7, wherein the weld face of the resistive welding electrode has a base weld face surface having a diameter that ranges from 6 mm to 20 mm and a spherical radius of curvature ranging from 15 mm to 300 mm.

12. The method set forth in claim 11, wherein the weld face of the resistive welding electrode includes a plurality of upstanding, radially-spaced circular ridges that surround a center of the weld face and project outwardly from the base weld face surface.

13. The method set forth in claim 7, wherein the workpiece stack-up includes only the aluminum alloy workpiece and the steel workpiece that overlap and contact one another to establish the faying interface such that an exterior surface of the aluminum workpiece provides the first side of the workpiece stack-up and an exterior surface of the steel workpiece provides the second side of the workpiece stack-up.

14. The method set forth in claim 7, wherein the workpiece stack-up includes the aluminum alloy workpiece and the steel workpiece that overlap and contact one another to establish the faying interface, plus an additional aluminum alloy workpiece, such that an exterior surface of the additional aluminum alloy workpiece provides the first side of the workpiece stack-up and an exterior surface of the steel workpiece provides the second side of the workpiece stack-up.

15. The method set forth in claim 7, wherein the workpiece stack-up includes the aluminum alloy workpiece and the steel workpiece that overlap and contact one another to establish the faying interface, plus an additional steel workpiece, such that an exterior surface of the aluminum alloy workpiece provides the first side of the workpiece stack-up and an exterior surface of the additional steel workpiece provides the second side of the workpiece stack-up.

16. A resistive welding electrode comprising:

an electrode body having a front end and a back end, the electrode body defining an accessible hollow recess open at the back end and having a circumference at the front end; and a weld face disposed on the front end of the electrode body, the weld face having a circumference that is coincident with the circumference of the electrode body at the front end of the electrode body or intersects with a transition nose that extends upwardly from the circumference of the front end of the electrode body, wherein the electrode body and the weld face are integrally formed and both the electrode body and the weld face are composed of a refractory-based material that includes at least 35 wt % of a refractory metal and has an electrical conductivity that is less than or equal to $3.8 \times 10^7$ S/m.

17. The resistive welding electrode set forth in claim 16, wherein the weld face includes a plurality of upstanding, radially-spaced circular ridges that surround a center of the weld face and project outwardly from a base weld face surface.

18. The resistive welding electrode set forth in claim 16, wherein both the electrode body and the weld face are composed of elemental molybdenum or elemental tungsten.

19. The resistive welding electrode set forth in claim 16, wherein the refractory-based material is a metal composite that includes 35 wt % or greater of molybdenum or tungsten.

20. The resistive welding electrode set forth in claim 19, wherein the refractory-based material is a tungsten-copper metal composite that comprise 50 wt % to 90 wt % of a tungsten particulate phase dispersed in a copper matrix.

* * * * *